United States Patent [19]
Kapgan et al.

[11] Patent Number: 5,662,362
[45] Date of Patent: Sep. 2, 1997

[54] SWAGE COUPLING INCLUDING DISPOSABLE SHAPE MEMORY ALLOY ACTUATOR

[75] Inventors: Michael Kapgan, Foster City; Richard H. Kosarchuk, Fremont, both of Calif.

[73] Assignee: Advanced Metal Components, Inc., Menlo Park, Calif.

[21] Appl. No.: 555,966

[22] Filed: Nov. 13, 1995

[51] Int. Cl.⁶ .................................................. F16L 25/00
[52] U.S. Cl. .................................. 285/381.1; 285/381.2; 285/381.5
[58] Field of Search ........................ 285/381.1, 381.2, 285/381.3, 381.5, 382

[56] References Cited

U.S. PATENT DOCUMENTS

| | | |
|---|---|---|
| 3,801,954 | 4/1974 | Dorrell . |
| 3,872,573 | 3/1975 | Nichols et al. . |
| 3,913,444 | 10/1975 | Otte . |
| 4,035,007 | 7/1977 | Harrison et al. . |
| 4,135,743 | 1/1979 | Hughes . |
| 4,149,911 | 4/1979 | Clabburn . |
| 4,198,081 | 4/1980 | Harrison et al. . |
| 4,226,448 | 10/1980 | Broyles . |
| 4,281,841 | 8/1981 | Kim et al. . |
| 4,283,079 | 8/1981 | Flaherty . |
| 4,310,183 | 1/1982 | Szalvay . |
| 4,314,718 | 2/1982 | Broyles et al. . |
| 4,379,575 | 4/1983 | Martin . |
| 4,424,991 | 1/1984 | Hill et al. . |
| 4,455,041 | 6/1984 | Martin . |
| 4,469,357 | 9/1984 | Martin . |
| 4,489,964 | 12/1984 | Kipp et al. . |
| 4,509,517 | 4/1985 | Zibelin . |
| 4,544,988 | 10/1985 | Hochstein . |
| 4,561,683 | 12/1985 | Lumsden et al. . |
| 4,563,876 | 1/1986 | Banks . |
| 4,836,586 | 6/1989 | Martin ................................. 285/381.3 |
| 4,872,713 | 10/1989 | Kapgan ................................. 285/381.3 |
| 4,934,743 | 6/1990 | Kapgan et al. . |
| 4,951,978 | 8/1990 | Martin . |
| 5,058,936 | 10/1991 | Kapgan et al. . |
| 5,409,268 | 4/1995 | Wagner ................................. 285/381.1 |

*Primary Examiner*—Eric K. Nicholson
*Attorney, Agent, or Firm*—Burns, Doane, Swecker & Mathis, L.L.P.

[57] ABSTRACT

A threadless self-swaging coupling for joining or capping pipe. The coupling includes a coupling member and an actuating member of a heat shrinkable polymer material or a shape memory alloy material which undergoes a change in shape when heated from a martensitic state to an austenitic state. The coupling includes an inner sleeve and an outer ring surrounding the inner sleeve. The outer ring is movable with respect to the inner sleeve such that the inner surface of the inner sleeve is deformed radially inwardly and swaged to a pipe fitted therein when the outer ring is moved with respect to the inner sleeve. The outer ring is engaged with the actuating member such that the outer ring can be rotated with respect to the inner sleeve when the actuating member is heated into the austenitic state. The actuating member can be left in place or removed from the coupling.

21 Claims, 2 Drawing Sheets

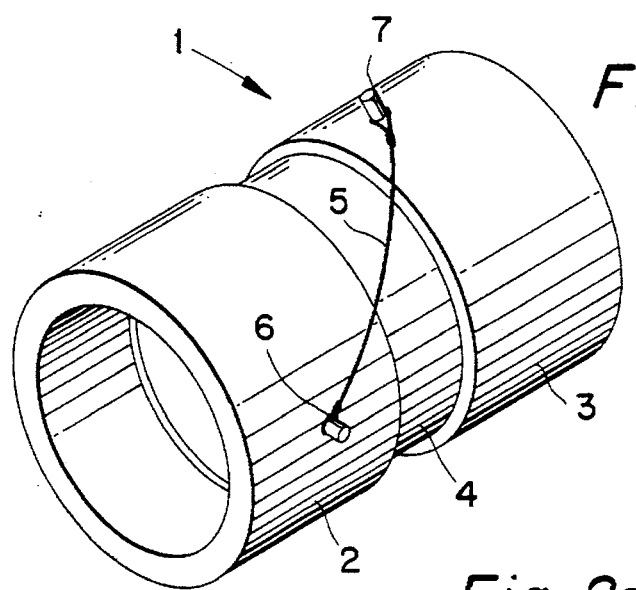
Fig. 1
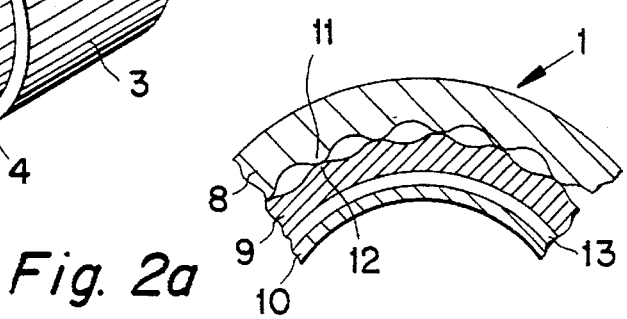
Fig. 2a
Fig. 2b
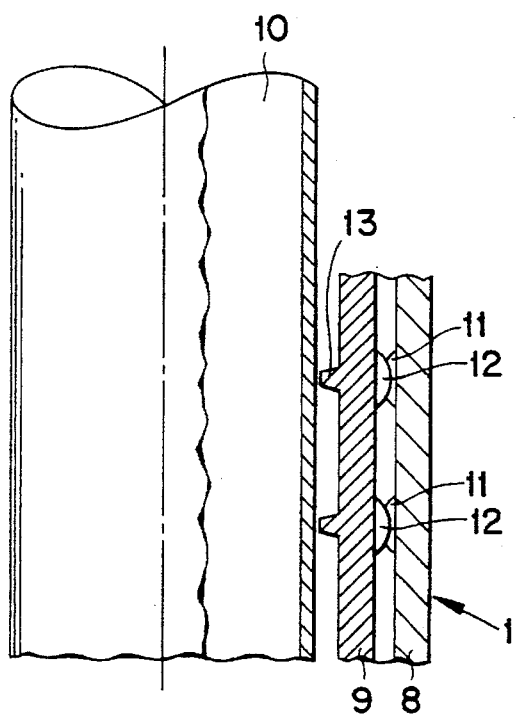
Fig. 3a
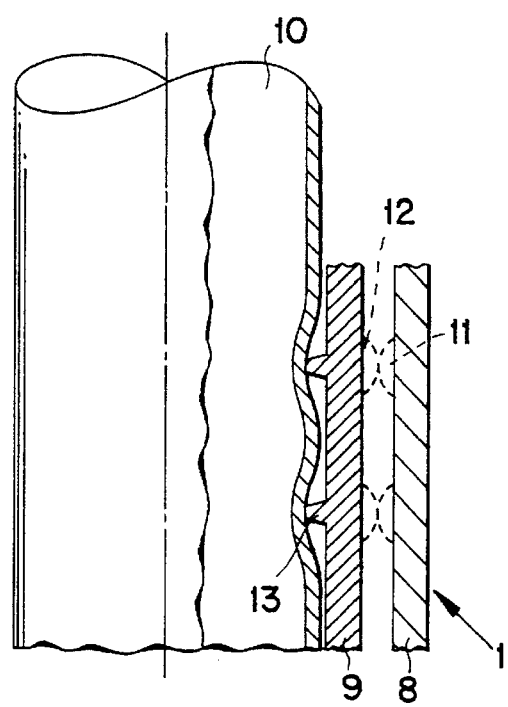
Fig. 3b

SWAGE COUPLING INCLUDING DISPOSABLE SHAPE MEMORY ALLOY ACTUATOR

FIELD OF THE INVENTION

The invention relates to a swage coupling for forming a connection with one or more members wherein a change in configuration of an actuator provides a motion to a coupling member to form a swage coupling.

BACKGROUND OF THE INVENTION

Couplings between pipes must frequently be made in environments where it is difficult to manipulate conventional tools, such as wrenches, used to engage the couplings. In such environments, a great advantage is provided by self-swaging couplings that can form swaged couplings without the use of conventional tools. By using shape memory alloys ("SMA") in couplings, pipes can be swaged together using heat to activate the couplings rather than conventional tools.

Shape memory alloys possess the useful characteristic of being capable of changing physical dimensions upon heating above a transition temperature, $A_f$, between a soft martensite phase and a hard austenite phase of the alloys. An SMA object can be processed while in a high temperature austenitic phase to take on a first shape. After cooling the SMA object below $M_f$ in the martensite phase without change of physical dimensions to memorize the first shape, the SMA object can be mechanically deformed into a second shape. The SMA object will remain in this second shape until heated to a temperature above $A_f$, at which time the SMA object will transform to austenite and revert to its memorized first shape. An SMA member can exert large forces on adjacent members during the heat activated transition from the second shape to the first shape.

Coupling members incorporating SMA elements are well known in the art. In many conventional SMA couplings, a cylindrical element of SMA material either contracts or expands at the transformation temperature, $A_f$, to apply a radial swaging force. Examples of these conventional SMA couplings can be found in U.S. Pat. Nos. 5,508,936; 4,951, 978; 4,489,964; 4,469,357; 4,455,041; 4,424,991; 4,379, 575; 4,314,718; 4,310,183; 4,283,079; 4,281,841; 4,226, 448; 4,198,081; 4,149,911; 4,135,743; 4,035,007; 3,913,444 and 3,872,573.

U.S. Pat. No. 5,508,936 ("Kapgan") discloses a tubular coupling having an SMA collar with two internal teeth, one of which is swaged onto a tube by heating the collar, while the other is mechanically deformed to cause it to bite into the tube by drawing a tapered sleeve axially over the tooth. Screw threads provide the means for axial movement.

In addition to ring-shaped SMA elements which decrease in diameter upon thermal activation to effect self-swage couplings, a length reduction in SMA rods upon thermal activation has also been used to effect a radial compression. For example, U.S. Pat. No. 4,489,964 ("Kipp") discloses a connector for joining pipe ends in which the linear contraction of SMA rods draws together wedges at the ends of the rods, and these wedges then radially compress a collar element. Devices utilizing transformation of SMA material to effect a linear force used to produce a rotational motion are disclosed in U.S. Pat. Nos. 4,563,876 ("Banks"); 4,544, 988 ("Hochstein") and 4,509,517 ("Zibelin"). U.S. Pat. No. 3,801,964 ("Dorrell") discloses a ring element of SMA to lock the joint of an electrical connector. U.S. Pat. No. 4,561,683 ("Lumsden") provides a pipe coupling of the screw-thread type.

Conventional SMA couplings suffer a number of limitations resulting from the presence of SMA material in the swaged couplings. For instance, a service and storage temperature limitation arises with conventional SMA couplings because cooling a swaged SMA coupling to a temperature below $M_f$ causes the SMA material to revert to a soft martensite phase which can result in weakening of the swaged coupling. Another disadvantage is the weight and cost limitations due to the relatively high weight and density of SMA material as compared to other materials used in mechanical couplings, and the requirement that conventional SMA couplings incorporate a large amount of expensive SMA material to generate a swaging force. A further disadvantage is that SMA materials can be difficult to machine into the shapes required by some conventional SMA coupling designs.

There is a need in the art for a coupling that overcomes the service and storage temperature restrictions, the relatively high weight, the expense and the manufacturing difficulties associated with conventional SMA couplings, while preserving the major advantages of these couplings.

SUMMARY OF THE INVENTION

The invention provides a coupling device for forming a swaged joint with a member to be joined, the coupling device including a coupling member and an actuating member. The coupling member includes an inner sleeve and an outer ring surrounding the inner sleeve, the inner sleeve including an axially extending opening therein for receiving a member to be joined to the coupling member. The outer ring is movable such as by rotation with respect to the inner sleeve and an inner surface of the inner sleeve is deformed radially inwardly by moving the outer ring with respect to the inner sleeve. The actuating member is engaged with the outer ring so as to move the outer ring upon a temperature induced change in configuration of the actuating member. The actuating member comprises a piece of material such as a shape memory alloy or heat shrinkable polymer which undergoes the temperature induced change in configuration upon heating the actuating member from a first temperature at which the material is in a first configuration (e.g., the shape memory alloy is in a martensitic state) to a second temperature at which the material is in a second configuration (e.g., the shape memory alloy is in an austenitic state).

The coupling device can incorporate various features. For instance, the outer ring can comprise a first outer ring and the coupling device can further include a second outer ring surrounding the inner sleeve. The second outer ring is movable with respect to the inner sleeve when the actuating member undergoes the temperature induced change in configuration and an inner surface of the inner sleeve is deformed radially inwardly by moving the second outer ring with respect to the inner sleeve. The actuating member can extend helically around the inner sleeve between points of attachment on the first and second outer rings whereby the first and second outer rings are moved such as by rotation in opposite directions by heating the actuating member to the second temperature.

The inner sleeve can include at least one outwardly extending projection on an outer surface thereof and the outer ring can include at least one inwardly extending projection on an inner surface thereof, in which case the inwardly extending projection engages the outwardly extending projection and deforms the inner surface of the inner sleeve radially inwardly when the actuating member is heated to the second temperature. According to a preferred embodiment, the inner sleeve includes a series of outwardly extending spaced-apart projections on an outer surface thereof and the outer ring includes a series of inwardly extending spaced-apart projections on an inner surface thereof, whereby the inwardly extending projections engage the outwardly extending projections and deform the inner surface of the inner sleeve radially inwardly when the actuating member is heated to the second temperature.

The inner sleeve can include at least one continuous annular ridge extending radially inwardly from the inner surface of the inner sleeve, in which case the annular ridge is deformed radially inwardly into sealing engagement with a substrate such as a pipe when the actuating member is heated to the second temperature. According to a preferred embodiment, the inner sleeve includes a plurality of axially spaced-apart annular ridges extending radially inwardly from the inner surface of the inner sleeve whereby the annular ridges are deformed radially inwardly into contact with an exterior of a pipe by heating the actuating member to the second temperature.

The actuating member can comprise a single piece of elongated shape memory alloy material or heat shrinkable polymer material which shrinks by heating the actuating member to the second temperature. According to a preferred embodiment, the actuating member is attached to an outer surface of the outer ring. If desired, the actuating member can be removably attached to an outer surface of the outer ring. The actuating member can comprise a single piece of wire, strip, rod, bar or other shape of elongated material which shrinks by heating the actuating member to the second temperature.

The coupling device can further include means for locking the outer ring in a fixed position with respect to the inner sleeve after the outer ring is moved by heating the actuating member to the second temperature. The locking means can take various forms such as a spring biased pin carried by the outer ring which engages a recess in the inner sleeve when the outer ring is rotated to a position of which the inner sleeve is deformed radially inwardly and forms a swaged joint with a pipe fitted within the inner sleeve.

BRIEF DESCRIPTION OF THE DRAWINGS

FIG. 1 illustrates a coupling device according to the invention wherein an actuating member is attached to two coupling members such that upon heat activation of the actuating member, the coupling members will rotate in opposite directions to form two swaged couplings;

FIG. 2a illustrates an axial cross-section of one of the coupling members shown in FIG. 1 prior to heat activation of an actuating member;

FIG. 2b illustrates an axial cross-section of the coupling member of FIG. 2a after heat activation of the actuating member;

FIG. 3a illustrates a longitudinal cross-section of one of the coupling members in FIG. 1 prior to heat activation of an actuating member;

FIG. 3b illustrates a longitudinal cross-section of the coupling member of FIG. 3a after heat activation of the actuating member;

DETAILED DESCRIPTION OF THE PREFERRED EMBODIMENTS

Figure 4:
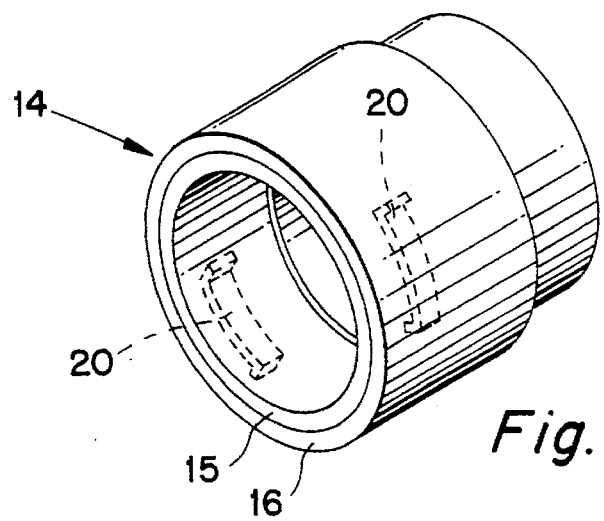
FIG. 4 illustrates a coupling device according to the invention wherein an actuating member is concealed between and attached to an inner sleeve and an outer ring such that upon heat activation of the actuating member the ring rotates relative to the sleeve and forms a swaged coupling.

According to the invention, a coupling for forming a swaged coupling is provided which represents a radical departure from conventional SMA couplings and bypasses numerous limitations of these self-swaging couplings while preserving the advantages of SMA technology.

The coupling according to the invention is useful for forming leak-tight fluid and/or gas connections between sections of pipe, tubing, etc. The coupling also can be used for mechanical connections and fastening applications. As an example, the coupling can be used to rotate an object by ¼ turn and thereby effect a fastening operation.

According to one aspect of the invention, a self-swaging coupling is provided wherein an actuating member can be removed from the swaged coupling without detriment to the leak-tight properties of the coupling. For instance, the actuating member can be detached from the swaged coupling after the joint is formed.

According to another aspect of the invention, a self-swaged coupling is provided having lower weight than conventional SMA couplings. For instance, by using an SMA coupling member which does not remain part of the swaged coupling, there is no need to use SMA coupling members which shrink or expand to form the swaged joint. This allows the coupling members to be made of lighter weight and/or less expensive materials.

Another advantage of the coupling device according to the invention is that the final swaged coupling is not subject to the usual service and temperature restrictions of conventional SMA couplings. For instance, since the actuating member is used to drive non-SMA coupling members, the final swaged joint is SMA-free. Thus, the joint can be exposed to temperature conditions which might deleteriously affect conventional SMA couplings (e.g., conventional SMA couplings could undergo size changes as a result of temperature changes which could weaken or destroy the couplings).

The coupling device according to the invention provides a self-swaging coupling without the usual costs and expenses associated with SMA elements. That is, the minimal use of SMA material in the inventive coupling device and the ability to recycle SMA material by removal of SMA actuator element from the swaged coupling will permit substantial cost savings over conventional SMA couplings. Also, the SMA actuator can be reused by mechanically deforming the SMA actuator in the martensitic state to a larger size or by cooling the SMA actuator to a suitable temperature if the SMA actuator is formed from a two-way reversible shape memory alloy material.

The invention also provides a self-swaging coupling that is relatively easy to manufacture and use. By using SMA material in wire or strip form as the actuator, as opposed to machining SMA bar stock into conventional SMA couplings, the coupling device according to the present invention can avoid the machining difficulties encountered with conventional SMA couplings.

One embodiment of the invention is illustrated in FIG. 1. A threadless coupling device 1 comprises axially spaced-apart coupling members 2 and 3 rotatably mounted on tubular sleeve 4. Actuating member 5 extends helically between attaching means 6 on coupling member 2 and attaching means 7 on coupling member 3. Actuating member 5 can comprise a strip, rod, wire or bar of shape memory alloy ("SMA") material. Actuating member 5 has been previously heat treated to memorize a particular shape. In particular, member 5 is annealed in the desired shape, cooled to below $M_f$ to transform the SMA to martensite and mechanically deformed to a larger size in the martensite phase. In forming a swaged coupling, actuating member 5 is heated by suitable means such as by electric resistance heating to a temperature above a transformation temperature $A_f$ of the SMA whereby the SMA transforms from a martensite phase to an austenite phase and the actuating member 5 shrinks from a larger to a smaller configuration. This change in configuration by actuating member 5 causes coupling members 2 and 3 to rotate in opposite directions and compressively deform tubular sleeve 4 radially inward. This compressive deformation can produce a swaged coupling between coupling device 1 and pipes fitted within coupling members 2, 3.

Further details of coupling device 1 are shown in FIGS. 2a–b and 3a–b. Coupling member 2 comprises an outer ring 8 and a portion of sleeve 4 comprises an inner compression ring 9. Fitted within compression ring 9 is tubular substrate 10. Arranged on the inner surface of outer ring 8 is an annular series of protrusion 11 extending radially inward. Protrusions 11 are engageable with an annular series of protrusions 12 extending radially outward from the outer surface of inner ring 9. Extending radially inward from the inner surface of inner ring 9 are one or more annular ridges 13. Activation of actuator member 5 rotates outer ring 8 with respect to inner ring 9 thereby moving protrusions 11 over protrusions 12 and compressing inner ring 9 and annular ridges 13 against tubular substrate 10 to form a swaged coupling.

Figure 5A:
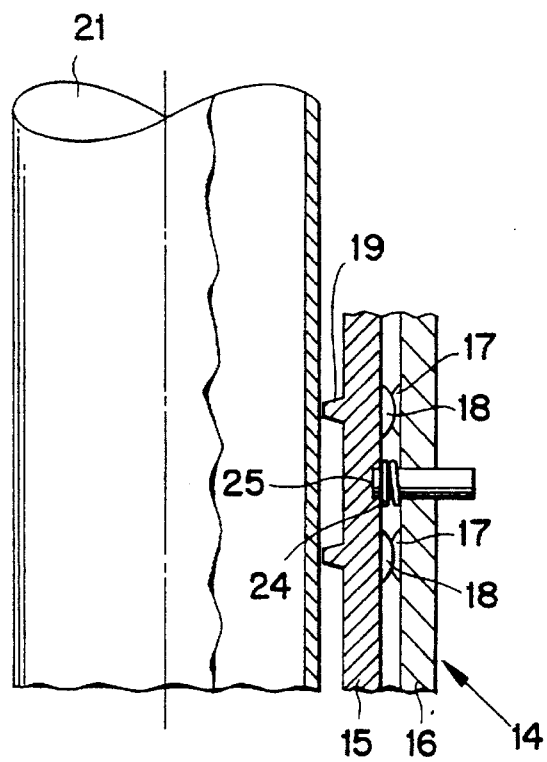
FIG. 5a illustrates a longitudinal cross-section of one of the coupling members in FIG. 4 prior to heat activation of an actuating member.
Figure 5B:
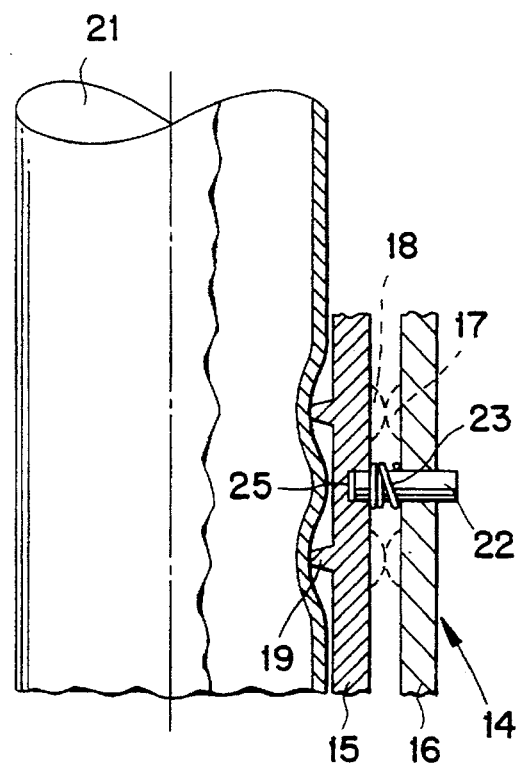
FIG. 5b illustrates a longitudinal cross-section of the coupling member of FIG. 5a after heat activation of the actuating member.

Another embodiment of the invention is shown in FIG. 4 wherein a single coupling member 14 includes inner ring 15 and outer ring 16. As shown in FIGS. 5a and 5b, coupling member 14 is similar to coupling members 2 and 3 in that an inner surface of outer ring 16 includes an annular series of protrusions 17 which engage an annular series of protrusions 18 on an outer surface of inner ring 15 and inner ring 15 includes one or more annular ridges 19 on an inner surface thereof for engaging a substrate when outer ring 16 is rotated with respect to inner ring 15. One or more actuating members 20 are connected between inner ring 15 and outer ring 20 such that upon heat activation of actuating member 20 outer ring 16 is rotated with respect to inner ring 15 thereby moving protrusions 17 over protrusions 18 and compressing inner ring 15 and annular ridges 19 against tubular substrate 21 to form a swaged coupling.

The compression of the inner ring 9 can be achieved by other techniques than those described above. For instance, elements can be provided between the inner ring 9 and the outer ring 8 which effect compression of inner ring 9 upon rotation of outer ring 8 or vice versa. The elements could be in the form of non-circular (e.g., oblong in axial cross-section) rods extending parallel to the axis of rotation of the rings 8,9. Such rods could be circumferentially arranged (like ball bearings) around the inner ring 9 so as to individually rotate from a first position (at which the inner and outer rings are separated by a first distance equal to a minimum dimension of rod thickness) to a second position at which the inner and outer rings are separated by a second distance which is larger than the first distance. As a result, the inner ring 9 would be compressed against the substrate 10. To effect rotation of the rods, the inner surface of the outer ring 8, the outer surfaces of the rods and the outer surface of the inner ring 9 can be appropriately machined such as by knurling, splining, etc., whereby the rings and rods cooperate to cause rotation of the rods upon rotation of the outer ring with respect to the inner ring.

The single coupling member shown in FIGS. 4 and 5a–5b can be embodied in other forms. For instance, the actuating member can be exposed and removable from the coupling member once the swaged joint is completed. As an example, pins similar to pins 6 and 7 in FIG. 1 could be provided on the outer surfaces of rings 15 and 16 with an SMA actuating wire extending therebetween. Also, the actuating member could extend between the outer ring 16 and a fixed object other than the coupling member such as a portion of the substrate, a wall, nearby structural member, etc.

As shown in FIGS. 5a and 5b, coupling member 14 includes spring actuated pin 22 for holding inner ring 15 and outer ring 16 in a fixed position when protrusions 17 are rotated to a position above protrusions 18. A compression spring 23 surrounds pin 22 and is compressed between stop 24 on pin 22 and the inner surface of outer ring 16. An inner end of pin 22 slides in circumferentially extending groove 25 in the outer surface of inner ring 15. Groove 25 is stepped such that when protrusions 17 overlie protrusions 18, pin 22 engages a deeper part of groove 25, as shown in FIG. 5b, whereby further rotation of outer ring 16 with respect to inner ring 15 is prevented by the engagement of pin 22 with the deeper part of groove 25.

The stop means shown in FIGS. 5a and 5b can be embodied in other forms. For instance, the pin can be biased radially outwardly and concealed between the inner and outer rings. In this case, when the outer and inner rings are in the proper position for forming a swaged coupling, an outer end of the pin can extend through a hole in an outer surface of the outer ring to provide a visual indication that the swaged coupling is complete. Another possibility includes opposed faces on the inner and outer rings which come into contact with each other when the protrusions on the outer ring overlie the protrusions on the inner ring. Still further, a stamped and formed cage with spring tabs fitted between the inner and outer rings could be used to stop rotation of the outer ring when the tabs snap into corresponding recesses in the inner and/or outer rings.

The material of the inner and outer rings of the coupling member can range from inexpensive materials such as plastics or metals or alloys of aluminum, copper, iron, steel, etc., to exotic materials such as molded, stamped or sintered powder metallurgically produced ceramics, cermets, composites, etc. The choice of materials will depend on the application of the coupling members which can range from coupling a garden hose to aerospace applications.

The actuating member can be heat activated in various ways. For instance, the actuating member can be exposed to an external source of heat such as a heat gun, induction heater, torch, etc., or heated resistively by passing an electrical current through the actuating member such as by using a detachable and disposable battery or other source of DC or AC current.

The various parts of the coupling can be made of any suitable materials and the relative size proportions of the parts can be adjusted depending upon the desired properties of the coupling or the articles to be joined to the coupling. For instance, the inner sleeve is preferably of a material having a hardness higher than that of the article to be joined to the coupling. In the case where the article is a plastic pipe, the inner sleeve can be of a metal such as steel, copper, aluminum or plastic of higher hardness than the plastic pipe. In the case where the article is a metal pipe, the inner sleeve can be of a metal having a higher hardness than the metal pipe. The outer ring preferably has lower elasticity than the inner sleeve whereby the inner sleeve will be radially deformed inwardly rather than the outer ring bring deformed radially outwardly.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve; and an actuating member engaged with the outer ring so as to move the outer ring with respect to the inner sleeve upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration.

2. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring comprising a first outer ring, the coupling device further including a second outer ring surrounding the inner sleeve, the second outer ring being movable with respect to the inner sleeve when the actuating member undergoes the temperature induced change in configuration, an inner surface of the inner sleeve being deformed radially inwardly by moving the outer ring with respect to the inner sleeve, the actuating member extending helically around the inner sleeve between the first and second outer rings and the first and second outer rings being moved by heating the actuating member to the second temperature.

3. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the inner sleeve including at least one outwardly extending projection on an outer surface thereof and the outer ring including at least one inwardly extending projection on an inner surface thereof, the inwardly extending projection engaging the outwardly extending projection and deforming the inner surface of the inner sleeve radially inwardly by heating the actuating member to the second temperature.

4. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the inner sleeve including a plurality of outwardly extending spaced-apart projections on an outer surface thereof and the outer ring including a plurality of inwardly extending spaced-apart projections on an inner surface thereof, the inwardly extending projections engaging the outwardly extending projections and deforming the inner surface of the inner sleeve radially inwardly by heating the actuating member to the second temperature.

5. The coupling device of claim 1, wherein the inner sleeve includes at least one annular ridge extending radially inwardly from the inner surface of the inner sleeve, the annular ridge being deformed radially inwardly by heating the actuating member to the second temperature.

6. The coupling device of claim 1, wherein the inner sleeve includes a plurality of annular spaced-apart ridges extending radially inwardly from the inner surface of the inner sleeve, the annular ridges being deformed radially inwardly by heating the actuating member to the second temperature.

7. The coupling device of claim 1, wherein the actuating member comprises a single piece of elongated shape memory alloy material which shrinks by heating the actuating member to the second temperature.

8. The coupling device of claim 1, wherein the actuating member is permanently attached to an outer surface of the outer ring.

9. The coupling device of claim 1, wherein the actuating member is removably attached to an outer surface of the outer ring after the temperature induced change.

10. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the actuating member comprising a single piece of wire of elongated shape memory alloy material which shrinks by heating the actuating member to the second temperature.

11. The coupling device of claim 1, wherein the actuating member comprises a single strip of elongated shape memory alloy material which shrinks by heating the actuating member to the second temperature.

12. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the coupling device further comprising means for locking the outer ring in a fixed position with respect to the inner sleeve after the outer ring is moved by heating the actuating member to the second temperature.

13. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring comprising a first outer ring, the coupling device further including a second outer ring surrounding the inner sleeve, the second outer ring being rotatable with respect to the inner sleeve when the actuating member undergoes the temperature induced change in configuration, an inner surface of the inner sleeve being deformed radially inwardly by rotating the outer ring with respect to the inner sleeve, the actuating member extending helically around the inner sleeve between the first and second outer rings and the first and second outer rings being rotated in opposite directions by heating the actuating member to the second temperature.

14. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring being rotatable with respect to the inner sleeve, the inner sleeve including at least one outwardly extending projection on an outer surface thereof and the outer ring including at least one inwardly extending projection on an inner surface thereof, the inwardly extending projection engaging the outwardly extending projection and deforming the inner surface of the inner sleeve radially inwardly by heating the actuating member to the second temperature.

15. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring being rotatable with respect to the inner sleeve, the inner sleeve including a plurality of outwardly extending spaced-apart projections on an outer surface thereof and the outer ring including a plurality of inwardly extending spaced-apart projections on an inner surface thereof, the inwardly extending projections engaging the outwardly extending projections and deforming the inner surface of the inner sleeve radially inwardly by heating the actuating member to the second temperature.

16. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring being rotatable with respect to the inner sleeve, the inner sleeve including a plurality of axially spaced apart annular ridges extending radially inwardly from the inner surface of the inner sleeve, the annular ridges being deformed radially inwardly by heating the actuating member to the second temperature.

17. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the outer ring being connected to a portion of the outer ring and a portion of the inner sleeve.

18. The coupling device of claim 1, wherein the actuating member comprises a piece of heat shrinkable polymer material.

19. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and a second actuating member, the second actuating member being engaged with the outer ring so as to move the outer ring upon a temperature induced change in configuration of the second actuating member, the second actuating member comprising a piece of a material which undergoes the temperature induced change in configuration upon heating the second actuating member from a first temperature at which the material is in a first configuration to a second temperature at which the material is in a second configuration.

20. A coupling device for forming a swaged joint with a member to be joined, the coupling device comprising:

a coupling member having an inner sleeve and an outer ring surrounding the inner sleeve, the inner sleeve including an axially extending opening therein for receiving a member to be joined to the coupling member, the outer ring being movable with respect to the inner sleeve and an inner surface of the inner sleeve being deformed radially inwardly by moving the outer ring with respect to the inner sleeve;

an actuating member engaged with the outer ring so as to move the outer ring upon a temperature induced change in configuration of the actuating member, the actuating member comprising a piece of a material which undergoes the temperature induced change in configuration upon heating the actuating member from a first temperature at which the material is in a first configuration to a second temperature at which the material is in a second configuration; and the actuating member being located between an inner surface of the outer ring and an outer surface of the inner sleeve.

21. The coupling device of claim 1, wherein the actuating member has a non-cylindrical configuration which extends around only a portion of the inner sleeve.

* * * * *